(12) United States Patent
Basu et al.

(10) Patent No.: US 9,158,704 B2
(45) Date of Patent: Oct. 13, 2015

(54) VIRTUAL MEMORY MANAGEMENT SYSTEM WITH REDUCED LATENCY

(71) Applicant: Wisconsin Alumni Research Foundation, Madison, WI (US)

(72) Inventors: Arkaprava Basu, Madison, WI (US); Mark Donald Hill, Madison, WI (US); Michael Mansfield Swift, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 241 days.

(21) Appl. No.: 13/749,334

(22) Filed: Jan. 24, 2013

(65) Prior Publication Data

US 2014/0208064 A1    Jul. 24, 2014

(51) Int. Cl.
*G06F 12/00* (2006.01)
*G06F 12/10* (2006.01)

(52) U.S. Cl.
CPC ............ *G06F 12/1027* (2013.01); *G06F 12/10* (2013.01)

(58) Field of Classification Search
None
See application file for complete search history.

(56) References Cited

U.S. PATENT DOCUMENTS

| | | | | |
|---|---|---|---|---|
| 5,961,581 A * | 10/1999 | Muthusamy | ................... | 708/670 |
| 6,741,258 B1 * | 5/2004 | Peck et al. | ...................... | 345/568 |
| 2002/0194389 A1 * | 12/2002 | Worley et al. | ................. | 709/310 |
| 2005/0223184 A1 * | 10/2005 | Russell et al. | ................ | 711/170 |
| 2006/0004979 A1 * | 1/2006 | Kawano et al. | ............... | 711/170 |
| 2007/0126756 A1 * | 6/2007 | Glasco et al. | ................. | 345/620 |

\* cited by examiner

*Primary Examiner* — Cheng-Yuan Tseng
*Assistant Examiner* — Craig Goldschmidt
(74) *Attorney, Agent, or Firm* — Boyle Fredrickson, S.C.

(57) ABSTRACT

A computer system using virtual memory provides hybrid memory access either through a conventional translation between virtual memory and physical memory using a page table possibly with a translation lookaside buffer, or a high-speed translation using a fixed offset value between virtual memory and physical memory. Selection between these modes of access may be encoded into the address space of virtual memory eliminating the need for a separate tagging operation of specific memory addresses.

15 Claims, 5 Drawing Sheets

VIRTUAL MEMORY MANAGEMENT SYSTEM WITH REDUCED LATENCY

STATEMENT REGARDING FEDERALLY SPONSORED RESEARCH OR DEVELOPMENT

This invention was made with government support under 1117280 and 0916725 awarded by the National Science Foundation. The government has certain rights in the invention.

CROSS REFERENCE TO RELATED APPLICATION

Not Applicable

BACKGROUND OF THE INVENTION

The present invention relates to computer architectures and, in particular, to a method and apparatus for managing virtual memory in a computer system in order to reduce memory access latency.

During the execution of the computer program, a computer processor may access a memory to read data needed as the arguments for executing instructions or to write data produced by the execution of those instructions. The accessed data may be identified by a unique physical address of a memory location holding that data.

Modern computer systems may hide the physical addresses of data accessed by a program by mapping those physical addresses to a virtual address space. Typically, using virtual addressing, processes (programs in execution) running on these computer systems, may see a linear virtual address space unique to each process. Virtual addressing provides a number of advantages including simplifying programming (by providing a uniform and simple address space), prevention of interference between concurrently executing processes (by segregating the address spaces of different processes), and providing illusion of larger than available physical address space size to the processes (by automatically moving physical memory and disk or storage).

In operation, a virtual memory system providing virtual addressing in a computer processor may employ a "page table" that translates between virtual addresses and physical addresses. In one embodiment, a virtual address may be expressed as a page address and an offset address. Offset address being a location within a given page relative to its page address. The page table maps a virtual page address to a physical page address using a table-like structure. The content of the page table (for example, linked pairs of virtual page addresses and physical page addresses) may be cached, for example, in a hardware cache structure termed a "translation lookaside buffer" (TLB), that holds a portion of the page table content that has been recently used to be rapidly accessible. The process of translation between virtual addresses and physical addresses may first look at the TLB and only if the necessary information is not found in the TLB, move to examine the page table. In the later case when necessary information is unavailable in TLB, significant delay is possible.

Thus, the indirection of accessing memory by looking up the TLB and/or the page table can significantly delay the speed of memory access.

SUMMARY OF THE INVENTION

The present invention provides a computer architecture that offers most of the benefits of virtual memory while significantly reducing the latency inherent in virtual memory as may be important for data intensive applications. The invention generally provides a hybrid system that allows some data accesses to be performed using the indirection of the conventional TLB and/or page table, and other data accesses to bypass the TLB and/or page table to directly access physical memory, for example with the simple addition of an offset value to the virtual address. The later way of data access can be much faster than the conventional indirection through the page table when an address is not in the TLB. Further, the particular mode of memory access (indirect or bypass) may be linked to a designated virtual address range, eliminating the need for additional translation steps in determining the type of memory access to be used.

Specifically then, the present invention provides a virtual memory computer system having a processor circuit executing program instructions, and a memory access circuit communicating with the processor circuit to access a main memory. The main memory provides physical addresses at which data may be read or written, to read argument data for the program instructions and to write value data resulting from execution of the program instructions. The memory access circuit may include a page table translating virtual addresses of argument data and value data to physical addresses according to an index structure linking virtual addresses to physical addresses. A bypass circuit detects a subset of the virtual addresses to bypass the page table and to translate a virtual address to a physical address according to a stored offset between the virtual address and the physical address (typically, but not necessarily a non-zero offset).

It is thus a feature of at least one embodiment of the invention to provide a system allowing both conventional page table translation of virtual addresses into physical addresses and a high-speed offset-based translation of virtual addresses into physical addresses.

The virtual memory computer system may further include a translation lookaside buffer holding selected portions of the page table linking virtual addresses to physical addresses and the memory access circuit may operate to interrogate the translation lookaside buffer for a particular virtual address before interrogating the page table for the particular virtual address.

It is thus a feature of at least one embodiment of the invention to provide a system that is compatible with modern page table systems employing translate lookaside buffers or similar cache systems.

The bypass circuit may detect the subset of virtual addresses according to a value of the virtual address.

It is thus a feature of at least one embodiment of the invention to segregate virtual memory into indirect and bypass accessible virtual memory without the need for an additional page table type or other index structure to enforce that segregation.

The subset of the virtual address may be defined by a base address and a limit address stored by the bypass circuit. The amount of memory that can be mapped through the subset is equal to the difference between the base address and the limit address.

It is thus a feature of at least one embodiment of the invention to provide for a high degree of flexibility in the amount of memory that may be allocated to bypass access.

The base address, limit address, and offset may be stored in dedicated registers associated with the bypass circuit.

It is thus a feature of at least one embodiment of the invention to allow for software or dynamic control of the segregation of virtual memory into indirect and bypass access portions.

The offset value may be the same for multiple virtual addresses of the subset.

It is thus a feature of at least one embodiment of the invention to provide an extremely fast direct address translation by employing a single offset value.

In one embodiment, the subset of virtual addresses associated with bypass access may be a precise fraction, such as one half, of the address range of virtual memory accessible to user-mode processes.

It is thus a feature of at least one embodiment of the invention to allow for extremely rapid discrimination between virtual memory portions devoted to indirect or bypass access, requiring evaluation of as little as a single most significant bit of the virtual address.

A method of the present invention may include the step of detecting dynamic memory allocation requests from a computer process and assigning virtual addresses from a given subset to the dynamic memory allocation requests so that access to the assigned virtual addresses bypasses the page table.

It is thus a feature of at least one embodiment of the invention to provide a method of automatic or semiautomatic implementation of hybrid indirect and bypass memory access for higher-speed processing operation by simply assigning bypass memory access to dynamically allocated memory.

Alternatively a method of the present invention may include the step of detecting a predetermined memory allocation requests among multiple memory allocation requests and to specifically assign predetermined memory allocation requests a virtual address from a given subset so that access to assigned virtual addresses bypasses the page table.

It is thus a feature of at least one embodiment of the invention to allow precise control of bypass memory access by the programmer or compiler at a software level through the use of special memory allocation requests.

These particular objects and advantages may apply to only some embodiments falling within the claims and thus do not define the scope of the invention.

DETAILED DESCRIPTION OF THE PREFERRED EMBODIMENT

Figure 1:
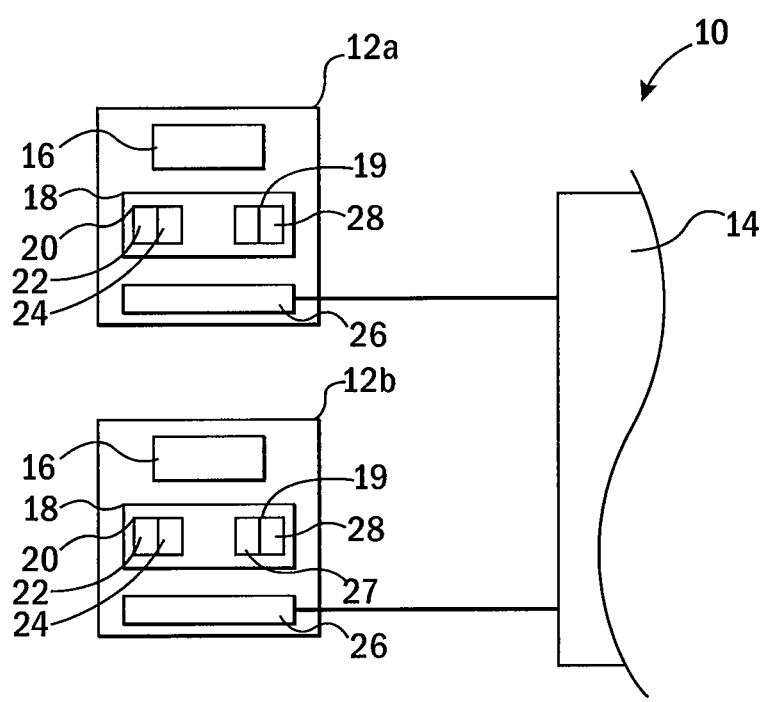
FIG. 1 is a simplified hardware representation of an example multiprocessor system suitable for use with the present invention having two processors communicating with a common physical memory.

Referring now to FIG. 1, a multiprocessor computer system 10 suitable for practice of the present invention may include one or more processors 12a and 12b communicating with a memory system 14, the latter including, for example, physical memory and one or both of solid-state and disk storage devices.

Each processor 12 may include a processor unit 16 for executing instructions of programs (for example read from the memory system 14) to operate on data read from the memory system 14 which provides argument to instructions of programs. This execution of the instructions then produces data values which may be written to the memory system 14. The different processors 12a and 12b may execute the same or different programs and each program may include multiple processes, individual or multiple of which may be executed by a given processor 12.

Access to the memory system 14 by the processor unit 16 is mediated through a memory access circuit 18 in turn communicating with a cache 26, the latter which is connected to memory system 14. The memory access circuit 18 provides for parallel paths between the processor unit 16 and the cache 26 passing respectively through an indirect access circuit 20 and a bypass circuit 19. The indirect access circuit 20 may include, in one example, a translation lookaside buffer (TLB) 22 and page table 24, both of the type generally understood in the art, but as will be described in more detail below. The bypass circuit 19 includes bypass detection circuit 27 and "primary region" registers 28, as will also be described in more detail below.

Figure 2:
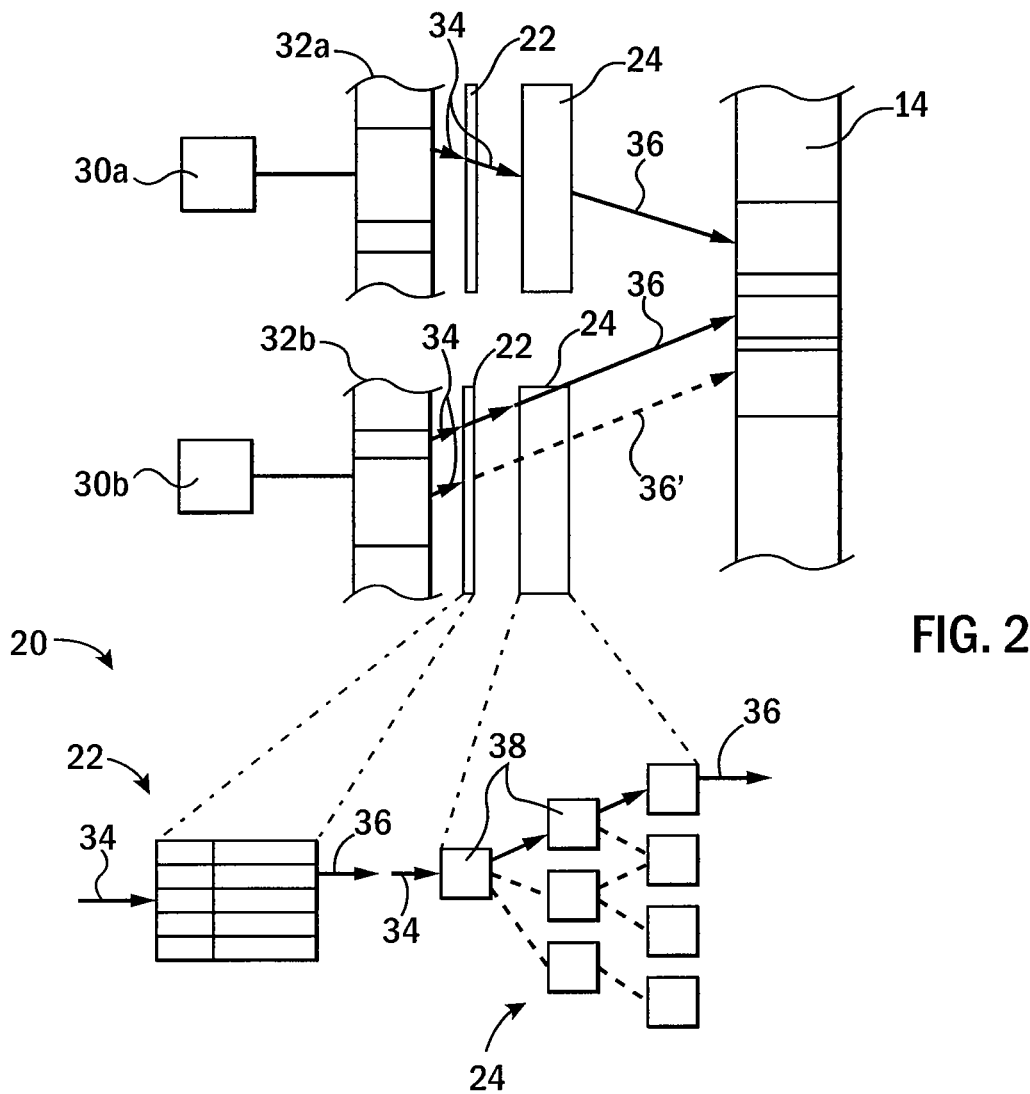
FIG. 2 is a logical diagram of memory accessed by the processors of FIG. 1 using a conventional translation lookaside buffer and page table.

Referring now to FIG. 2, different processes 30a and 30b may access physical memory system 14 in a first mode of operation of the present invention using conventional virtual memory address translation techniques. In such techniques, a given process 30a or 30b identifies data for access using a virtual address within a different virtual memory space 32a and 32b associated with and unique to each given process 30a and 30b. Each virtual memory space 32a and 32b may provide for an identical range of addresses from a base address (e.g. zero) to some limit address of arbitrary size.

In order to obtain the physical address with the memory system 14, a virtual address 34 from a process 30 is provided to the page table 24, the latter which converts the virtual address 34 into a physical address 36. The page table 24 will typically provide an index structure traversed by a so-called "page walk" through different page table entries 38, for example, as arranged in a tree structure which may be held in a memory or in cache 26. Typically, up to four different, time-consuming accesses to different page table entries 38 may be needed to yield the necessary physical address 36.

Referring still to FIG. 2, average time required to walk the page table 24 may be reduced by caching recently accessed page table contents in the TLB 22. The TLB 22 holds a recent subset of the contents of the page table 24 in a structure tuned for faster access, for example, using a content addressable memory, hash table or the like. If the page table entry for translating the requested virtual address is found in the TLB 22 ("a hit"), access to the page table 24 may be avoided in favor of the physical address 36' provided by the TLB 22. When the page table entry for translating the requested virtual address is not found in the TLB 22 ("a miss"), access to the page table 24 is required. Memory accesses using the page table 24 and/or the TLB 22 will be termed herein indirect memory accesses.

Figure 3:
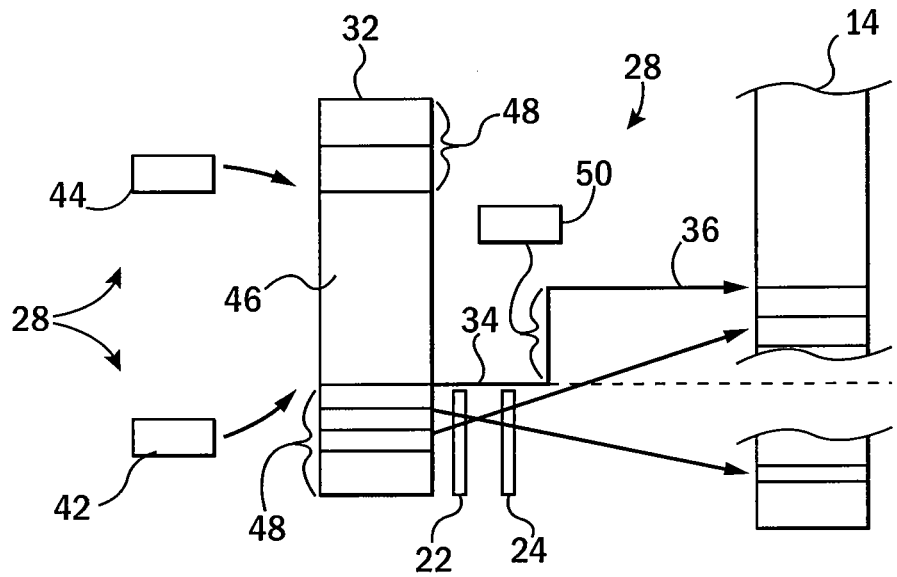
FIG. 3 is a logical diagram similar to that of FIG. 2 showing hybrid virtual memory access allowing indirect and bypass memory access as may be implemented by the present invention.

Referring now to FIG. 3, the present invention provides a second path of memory access that will be termed bypass memory access and which, as the name implies, bypass both the TLB 22 and page table 24. Generally, bypass memory access will be performed only for subset of memory accesses. In order to determine whether bypass memory access will be used, a designated "primary region" 46 of the virtual memory space 32 is delimited by registers 28 including a base register 42 and a limit register 44. The base register 42 may hold the lowest address of a virtual memory primary region 46 and the limit register 44 may hold the highest address of the primary region 46.

Generally, each of the base register 42 and limit register 44 may be set arbitrary values by the operating system; however, in one embodiment the value of the base register 42 may be effectively set to a midpoint address equal to one half the total virtual address space 32. This setpoint allows virtual address values above the base address that may be identified simply by evaluating a single most significant bit of the virtual address. Accordingly, the term "base register" should be understood to include any implementation of the designation of the lowest address of the primary region 46.

Typically, the primary region 46 will be less than all of the virtual memory space 32, leaving virtual addresses regions 48 above and/or below the primary region 46 for use through conventional page-based virtual memory.

Using this system, a memory access for virtual addresses within the conventional paging regions 48 are decoded using the TLB 22 and/or page table 24 as described above with respect to FIG. 2. On the other hand, memory access for virtual addresses within the primary region 46 is performed without use of the TLB 22 and page table 24. Instead, the virtual address 34 is converted to a physical address 36 simply by adding an offset value from an offset register 50 providing extremely fast memory access. Generally the offset value of offset register 50 can be positive or negative and, in systems using addresses composed of page addresses and offset addresses within the page, the value of offset register 50 may be an integer multiple of the size of the page.

Figure 4:
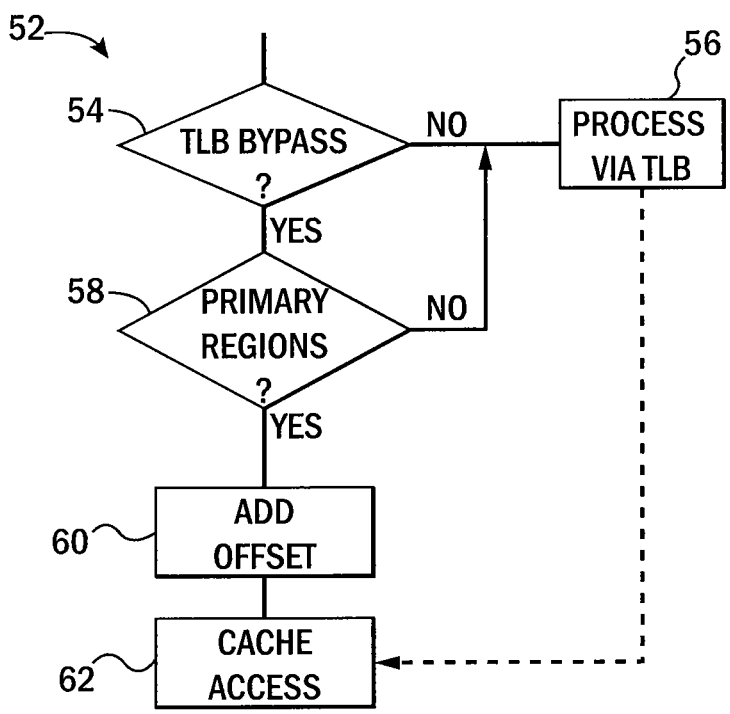
FIG. 4 is a flowchart showing steps in the operation of a first embodiment of the present invention in implementing the hybrid virtual memory access.

Referring now to FIGS. 1, 3 and 4, memory access circuit 18 may select between memory access through the indirect access circuit 20 and the bypass circuit 19 through a multistep program 52 implemented generally by a combination of hardware and operating system. At a first decision block 54, the program 52 determines whether the bypass system of the present invention should be activated, otherwise allowing the computer system 10 to work solely as described with respect FIG. 2. Activation of the bypass system may be done, for example, by setting a hardware flag by the operating system.

If bypass memory access is deactivated at decision block 54, then at process block 56, any request for a virtual memory access is handled by the TLB and/or page table 24 per conventional virtual memory access techniques. A physical address 36 produced by this technique is then provided to the cache for cash access per process block 62.

Otherwise, the program 52 proceeds to decision block 58 and the request for virtual memory access compares the virtual address 34 of the request to the range established by the base register 42 and limit register 44 as described above. If the virtual address 34 is not within the range defining the primary region 46 (shown in FIG. 3) the program 52 diverts the request again to process block 56 by conventional TLB/page table conversion to a physical address.

If at decision block 58, the address of the requested virtual memory is within the range defining the primary region 46, then the offset value of offset register 50 (which may be positive or negative) is added to that requested virtual address 34 as indicated by process block 60 provide a physical address 36 that may be provided to the cache at process block 62.

It should be noted that the memory access path of process block 60 is on average faster than a conventional access to memory via process block 56 as the access path of process block 60 can translate very large (theoretically unlimited) amounts of memory (from base address to the limit address) while the TLB is limited to translating memory of size equal to its number of entries times the page size. Due to this limited translation capacity of TLB requested translation information might not be available at the TLB, triggering long latency page-walk that typically requires multiple memory accesses. In comparison, all accesses through process block 60 finds the requested translation by sampling addition of an offset without needing any memory accesses.

Figure 5:
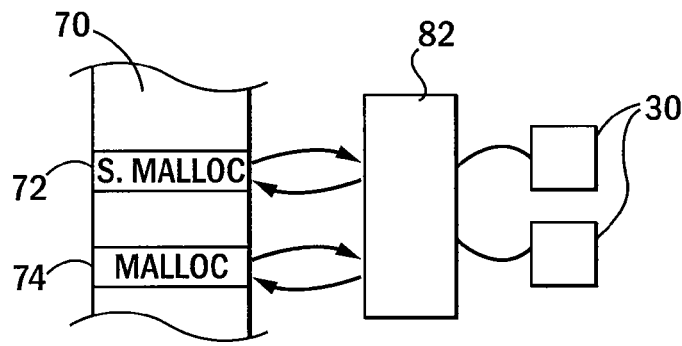
FIG. 5 is a simplified representation of a user program to access alternative program instructions that may invoke bypass virtual memory access.

Referring now also to FIG. 5, the process of activating the hybrid memory access per decision block 54 may be performed by the operating system 82 detecting within a program 70 holding a process 30 performing the memory accesses, a special memory allocation function 72 (e.g. "Special or S-MALLOC) indicating a desire by the process 30 for allocation of memory within the primary region 46. This special memory allocation function 72 (which need not be dynamic) may be detected by operating system calls. In allocating the memory for the process 30, the operating system may set the values of the base register 42 and limit register 44 and may provide the offset value of the offset register 50, otherwise using standard memory allocation techniques.

Alternatively, a special memory allocation function 72 need not be used and instead the operating system may automatically respond to any standard dynamic memory access function 74 (e.g., MALLOC) to implement the bypass memory access of the present invention.

Figure 6:
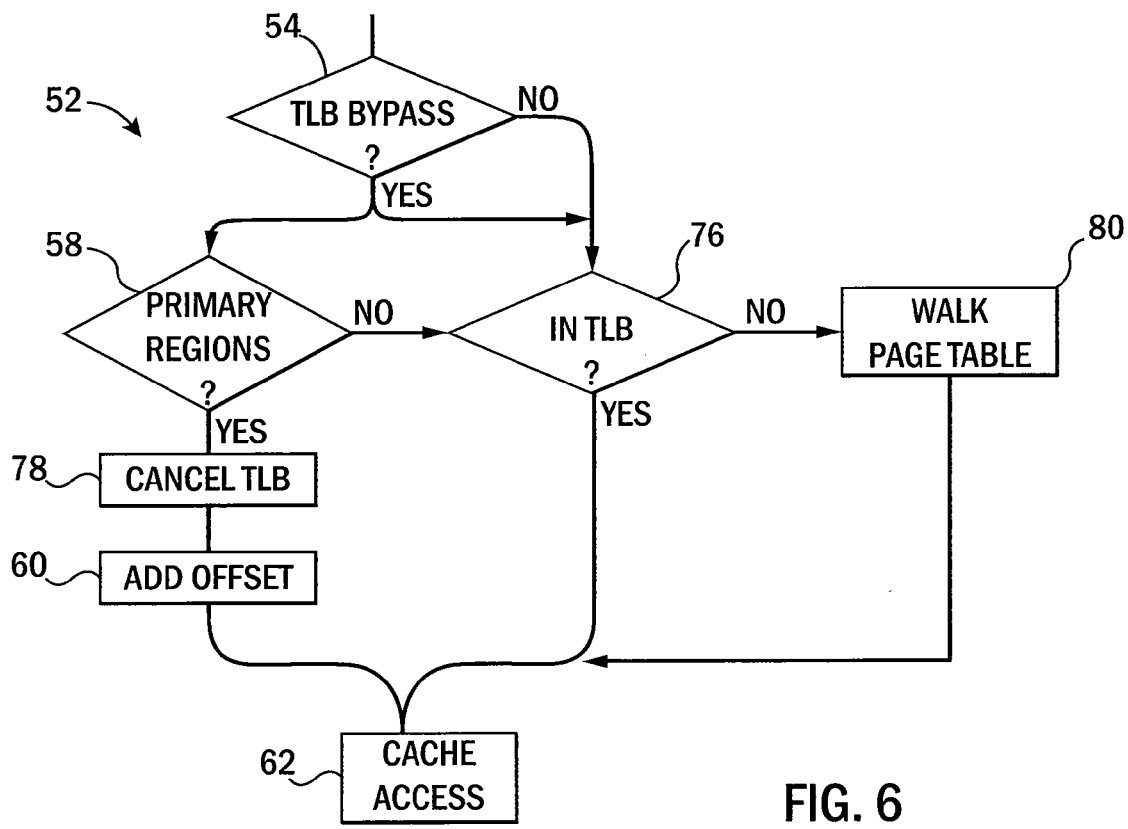
FIG. 6 is a flowchart similar to that of FIG. 4 showing a second embodiment of the present invention with parallel implementation of indirect and bypass access for improved performance.

Referring now to FIG. 6, the program 52 of FIG. 4 may be accelerated by concurrent evaluation of indirect and bypass addresses. In this case, proceeding from decision block 54, the program 52' may simultaneously evaluate decision block 58 which determines whether the virtual address being accessed is within the primary region 46, and decision block 76 which interrogates the TLB 22 to see if the virtual address is within the TLB. The process of decision block 58 may complete faster than the process of decision block 76 and, accordingly, if it is determined that the virtual address falls within the primary region 46, the program 52' may proceed to process block 78 to cancel the TLB lookup of decision block 76. In this case, the program 52' proceeds next to process block 60, as has been described above, and then accesses the cache at process block 62 using the resolved physical address 36 produced by adding an offset to the virtual address 34 at process block 60. If the process of decision block 58 is slower than the process of decision block 76, it can be assumed that the process of decision block 76 has followed the path to process block 80 and the page walk of process block 80 may be cancelled instead.

If at decision block 58, the virtual address 34 of memory access is not within the primary region 46, the program 52' proceeds from decision block 58 to decision block 76 and the TLB lookup of decision block 76, which is already in progress, is completed. If the desired virtual address is in the TLB 22, the TLB 22 provides a physical address 36 and the program 52' proceeds directly to cache access at process block 62. Otherwise, the program proceeds to process block 80 and performs a walk through the page table 24 to obtain the necessary physical address 36 for a cache access at process block 62.

Figure 7:
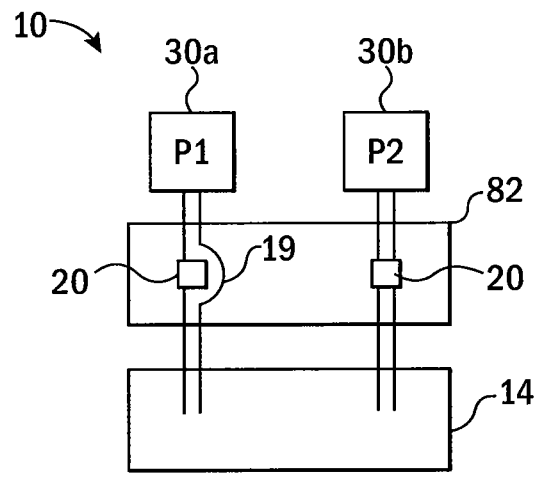
FIG. 7 is a simplified representation of the software architecture of a simple multiprocessor system using the hybrid virtual memory access of the present invention with a single operating system.

Referring now to FIG. 7, in a conventional multiprocessor computer system 10, multiple processes 30a and 30b may communicate to the memory system 14 through a combination of a single operating system and hardware 82'. In this case, a process 30 may use either the indirect access circuit 20 exclusively (by appropriate flagging of decision block 54 of FIG. 6) as depicted for process 30b or both the indirect access circuit 20 and bypass circuit 19 as depicted for process 30a.

Figure 8:
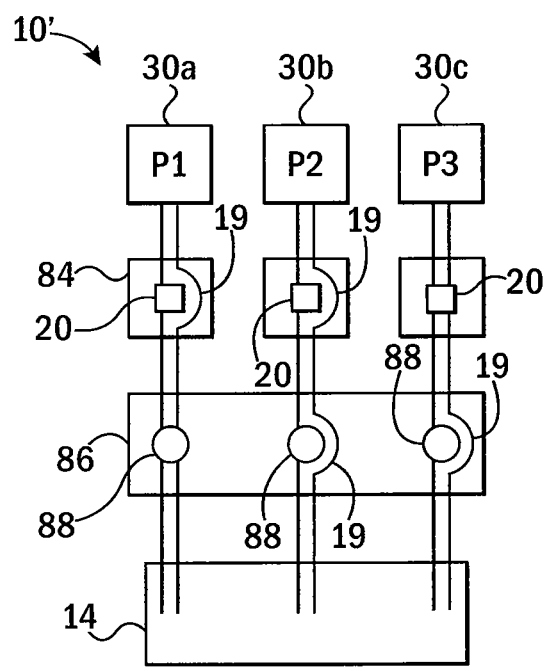
FIG. 8 is a figure similar to that of FIG. 7 showing the software architecture of the present invention when used in a virtualization environment.

Referring to FIG. 8, in a virtualized multiprocessor computer system 10', the present invention may be used in a number of different ways. In a first option illustrated with respect to process 30a, the process 30a may communicate directly with a combination of a guest operating system/hardware 84 which may implement indirect access circuit 20 and the bypass circuit 19. The resolved physical addresses may then be passed through the conventional TLB and page table established by the virtualizing operating system 86 (e.g., a hypervisor). In this example, the virtualizing operating system 86 may establish its own virtualizing address translation 88 as part of the virtualization process but otherwise be unaffected by the present invention.

Alternatively, a process 30b may establish the indirect access circuit 20 and the bypass circuit 19 of the present invention in the guest operating system/hardware 84 and a similar bypass circuit 19 with respect to the virtualizing address translation 88 of a virtualizing operating system 86. Alternatively, as indicated by process 30c, a bypass circuit 19 may be established only in the virtualizing operating system 86 in conjunction with its virtualizing address translation 88.

While the above description considers the case where there is only a single "primary region", it will be generally understood that the principles described above can be applied to the use of multiple such regions in a bypass mode, each region with its own offset, and that the invention is not limited to the use of a single "primary region". In such a system, virtual memory addresses would be detected in process block 58 of FIG. 4 or 6 with respect to multiple ranges each associated with a different "primary region" and a different offset. Special calls to the operating system may be used to distinguish between the different primary regions or the operating system may select the region based on other criteria.

It will be further appreciated that the present invention is also applicable to a single processor system or to a multiprocessor or multi-core system having an arbitrary number of processors or cores and that the above example describing two processors should not be considered to be limiting.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "compris-ing", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to a "processor" or "processor unit" should generally be understood to refer broadly to general-purpose computer processing elements for executing stored programs (software) comprised of sequences of arithmetic and logical operations stored in the general-purpose memory. The term "circuit" as used herein should be considered to broadly include both analog and digital circuitry together with associated firmware. The term "program" generally refers to a sequence of operations executed by a processor or circuit. References to memory, unless otherwise specified, can combinations of different memory structures including solid-state and electromechanical memories and may describe a distributed system of main memory and multiple cache layers. The term page table should be understood generally relate to a table mapping predefined address blocks of memory between a virtual address space and a physical address space regardless of the exact size of those blocks or the particular name given to the blocks.

In all these cases, the guest operating system or hypervisor establish or install the bypass mapping values and the actual bypass is handled by the processing circuitry.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:
1. A virtual memory computer system comprising:
a processor circuit executing program instructions;
a memory access circuit communicating with the processor circuit to receive a given virtual address having a virtual address range unique to a process executed by the processor circuit to access a main memory by translating the given virtual address into a physical address at which data may be read or written, to read argument data for the program instructions and to write value data resulting from execution of the program instructions, wherein the memory access circuit includes:
(a) a page table translating virtual addresses of argument data and value data to physical addresses according to an index structure linking virtual addresses to physical addresses; and
(b) a bypass circuit detecting whether the given virtual address is in a subset of the virtual range, the subset of the virtual address range including multiple virtual addresses and being less than the available virtual addresses of the virtual address range, and based on the results of that detecting, when the given virtual addresses is in the subset of virtual address range, to bypass the page table and to translate a virtual address to a physical address by applying a non-zero stored offset between the virtual address and the physical address to the virtual address and when the given virtual address is not in the subset of virtual range to use the page table information to translate the virtual address to a physical address;

wherein a single non-zero stored offset applies to all virtual addresses within the subset of the virtual address range.

2. The virtual memory computer system of claim 1 further including a translation lookaside buffer holding portions of the page table linking virtual addresses to physical addresses wherein the memory access circuit operates to interrogate the translate lookaside buffer for a particular virtual address before interrogating the page table for the particular virtual address.

3. The virtual memory computer system of claim 2 wherein the bypass circuit detects the subset of virtual addresses according to a value of the virtual address.

4. The virtual memory computer system of claim 3 wherein the value of the virtual address is defined by a base address and a limit address stored by the bypass circuit.

5. The virtual memory computer system of claim 4 wherein the base address, limit address, and offset are stored in dedicated registers associated with the bypass circuit.

6. The virtual memory computer system of claim 1 wherein the offset value is the same for all virtual addresses of the subset.

7. The virtual memory computer system of claim 3 wherein the subset of virtual addresses is evaluated by examining only a single most significant bit of the virtual address.

8. A method of managing virtual memory in a computer system comprising the steps of:
(a) receiving a virtual address from a computer process executed by a computer processor the virtual address having a virtual address range unique to the computer process;
(b) detecting whether the virtual address is within a predefined primary region address range being a subset of the virtual address range holding at least some virtual addresses of the virtual address range and less than all available virtual addresses;
(c) when the virtual address is not within the predefined primary region address range, applying the virtual address to a page table translating the virtual address to a physical address of a memory circuit for access to the memory circuit; and
(d) when the virtual address is within the predefined primary region address range, applying a non-zero offset to the virtual address to determine a physical address of the memory circuit for access to the memory circuit wherein a single non-zero offset applies to all virtual addresses within the subset of the virtual address range.

9. The method of claim 8 further including the step of detecting a dynamic memory allocation request of a user process to assign virtual, addresses within the primary region.

10. The method of claim 8 further including the step of detecting a predetermined memory allocation requests among multiple memory allocation requests to specifically assign computer process variables associated with the predetermined memory allocation instruction to virtual addresses within the primary region.

11. The method of claim 8 wherein step (c) further includes the step of interrogating a page table cache for the virtual address and in cases when the virtual addresses is in the page table cache, using an associated physical address for access to the memory circuit without applying the virtual address to the page table.

12. The method of claim 8 further including the step of receiving values from operating system running on computer processor, the values determining at least size of the predefined primary region and a location of the predefined primary region.

13. The method of claim 12 wherein the values define a base address being a lowest address of the predefined primary region and a limit address being a highest address of the predefined primary region.

14. The method of claim 8 wherein the offset is the same for all virtual addresses of the primary region.

15. The method of claim 8 wherein the primary region begins at a midpoint of the virtual address range.

* * * * *